United States Patent [19]

Frey et al.

[11] 4,435,128
[45] Mar. 6, 1984

[54] APPARATUS FOR ASCERTAINING A PREDETERMINED ROTARY POSITION OF A ROTATIONAL BODY

[75] Inventors: Hansjörg Frey; Heinrich Hampel; Rolf Müller; Ernst Ritter; Reinhard Schwartz, all of Stuttgart, Fed. Rep. of Germany

[73] Assignee: Robert Bosch GmbH, Stuttgart, Fed. Rep. of Germany

[21] Appl. No.: 387,399

[22] Filed: Jun. 11, 1982

[30] Foreign Application Priority Data

Jul. 9, 1981 [DE] Fed. Rep. of Germany ....... 3127048

[51] Int. Cl.³ .................... F04B 21/00; F04B 51/00
[52] U.S. Cl. .................... 417/63; 73/119 A; 123/509
[58] Field of Search ............ 417/63, 313, 238; 123/509, 495; 73/119 A; 92/128; 403/12, 13, 14

[56] References Cited

U.S. PATENT DOCUMENTS

| | | | |
|---|---|---|---|
| 3,702,577 | 11/1972 | Staudt et al. | 92/15 |
| 3,875,792 | 4/1975 | Krohn et al. | 73/119 A |
| 4,167,926 | 9/1979 | Hosaka et al. | 123/489 X |
| 4,190,401 | 2/1980 | Hofmann et al. | 417/313 |
| 4,322,174 | 3/1982 | Ishii et al. | 417/313 X |
| 4,385,867 | 5/1983 | Straubel et al. | 417/63 |

FOREIGN PATENT DOCUMENTS

| | | |
|---|---|---|
| 874531 | 8/1952 | Fed. Rep. of Germany . |
| 2700878 | 7/1977 | Fed. Rep. of Germany . |
| 2843039 | 4/1980 | Fed. Rep. of Germany . |
| 2949018 | 6/1981 | Fed. Rep. of Germany . |
| 2065793A | 7/1981 | United Kingdom . |

Primary Examiner—Edward K. Look
Attorney, Agent, or Firm—Edwin E. Greigg

[57] ABSTRACT

A rotational body supported in a housing of the apparatus carries an angle indication marker, which serves as a signal trigger of a signal transducer secured in a positionally fixed manner relative to the housing of the rotational body. The signal transducer has a transducer body axially displaceably disposed in its transducer housing. This body is displaceable in the direction of its longitudinal axis in order to actuate a first contact switch, and is provided inside its other end face with a switch contact, cooperating with the angle indication marker, of a second contact switch. After the actuation of both contact switches, the angle indication marker is located in a predetermined rotary position, which is indicated in the associated test circuit and serves in particular to ascertain the supply onset position of the drive shaft of a fuel injection pump for internal combustion engines.

12 Claims, 6 Drawing Figures

APPARATUS FOR ASCERTAINING A PREDETERMINED ROTARY POSITION OF A ROTATIONAL BODY

BACKGROUND OF THE INVENTION

The present invention relates to an apparatus for ascertaining a predetermined rotary position of a rotational body, and in particular the supply onset position of the drive shaft of a fuel injection pump for an internal combustion engine.

For adjusting, testing and relocating a predetermined rotary position of a rotational body, it is necessary to be able to adjust precisely the rotary position of an angle indication marking firmly connected with the rotational body, or, following adjustment, to be able to perform precise measurement with reference to the housing of the rotational body. In particular in fuel injection pumps, it is necessary to measure the supply onset position or a rotary position corresponding to the supply onset of the cam, associated with the first pump outlet after the drive mechanism of the cam shaft, here representing the rotational body or drive shaft; subsequently, the cam shaft must be held in a fixed position in order to be able to mount the injection pump on the appropriately prepared internal combustion engine. Now in order to be able to adjust the supply onset position of the cam shaft initially, various static and also dynamic measurement procedures are known. The oldest static measurement procedure is the so-called overrun method, by means of which the static supply onset of the injection pump, which has already been adjusted in terms of the preliminary stroke, can be looked for. The pump section chamber placed under fuel pressure and the cam shaft is slowly rotated until the pump piston closes the suction bore during its upward stroke, and the fuel stops flowing out. In this rotary position, a marking for supply onset is made by means of a slash found on the housing; however, this marking is too imprecise for present-day stringent exhaust gas regulations, and it has the grave disadvantage that the slash marking either cannot be seen from outside or can be seen only with difficulty once the pump is mounted to the gear box of the engine, for instance with an end flange.

Dynamic measurement procedures, such as those known or proposed in German Offenlegungsschrift (laid application) 27 00 878 and German patent application P 29 49 018.4, are more precise but in terms of the expenditure for measurement compliance they are very expensive. However, such procedures can be used in the manufacturing operation for injection pumps for the initial establishment of the predetermined rotary position of the angle indication marking.

OBJECT AND SUMMARY OF THE INVENTION

It is accordingly the principal object of the present invention to furnish a simple testing apparatus by means of which the supply onset position of the drive-shaft, once established, can be tested or if needed readjusted in case repair to the pump becomes necessary.

This object is achieved by the provision of a signal transducer which is displaceable in a direction which at least approximately radial with respect to the axis of rotation of the driveshaft to trigger a test circuit, thereby indicating the rotary position of the driveshaft. The apparatus according to the present invention has the advantage that once there is an approximation of the predetermined rotary position, a first rough indication signal is present and subsequently, by means of a second contact switch, the precise rotary position can be fixed in a simple manner. For the initial setting of the predetermined rotary position, the apparatus according to the invention can be used in combination with a known supply onset signal transducer, in order to place the marking in the correct position with the reference to the housing. If the driveshaft of the injection pump or the rotational body has already been adjusted, then it suffices to secure the signal transducer to the associated housing of the rotational body and to rotate the drive shaft until such time as the rotary position signal triggered by the second contact switch of the precise-indication switching circuit has appeared.

Advantageous embodiments, further modifications of and improvements to the apparatus disclosed in the main independent claim 1. The characteristics of claim 2 assure simple manufacture of the transducer body and satisfactory insulation with respect to the housing. In an exemplary embodiment in accordance with claim 3, it is possible to fabricate the entire transducer body of insulating material, and in an embodiment of the apparatus as defined by claim 4 it is possible to equip the apparatus with a separate source of operating voltage, such as dry-cell batteries, so that the entire apparatus can be handled like a simple test lamp.

In an apparatus equipped in accordance with claims 6 or 7, the apparatus can be connected to the vehicle's electrical system or to a separate source of operating voltage, and furthermore reliable functioning is assured.

In an apparatus equipped in accordance with the characteristics of claim 9, which can particularly be used in combination with the characteristics of claim 1 for ascertaining the supply onset position of the driveshaft of a fuel injection pump, both the signal transducer and also the portion carrying the angle indication marking are able to maintain the position fixed during manufacture; in order to adjust the predetermined rotary position, the angle indication marking needs only to be mounted in the position precisely corresponding to supply onset, and this can be effected by an appropriate tool. To prevent the position of the angle indication marking from shifting once it has been fixed and adjusted, it is advantageous for the side walls of the oblong slot to be embodied in accordance with the characteristics of claim 10. Very favorable assembly is provided if the apparatus is equipped in accordance in accordance with the characteristics of claim 11.

The invention will be better understood and further objects and advantages thereof will become more apparent from the ensuing detailed description of preferred embodiments taken in conjunction with the drawings.

DESCRIPTION OF THE PREFERRED EMBODIMENTS

Although the apparatus according to the invention can be used for ascertaining a predetermined rotary position of an arbitrary rotational body, even of a tool turntable, the exemplary embodiment described below relates exclusively to apparatus for ascertaining the supply onset position of the driveshaft of fuel injection pumps.

Figure 1:
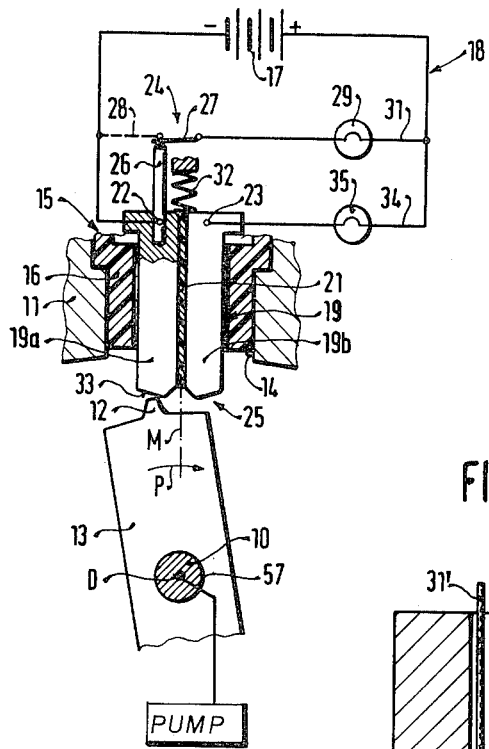
FIG. 1 is a simplified illustration of the first exemplary embodiment.

In the first exemplary embodiment shown in FIG. 1 in simplified form, a drive or cam shaft 10 acting as the rotational body and rotating about a rotary axis D of a fuel injection pump (not shown in further detail) is supported in an associated housing 11 and firmly connected with a part 13 carrying an angle indication marking 12. The part 13 may be a separate structural component connected by a conical connection with the driveshaft 10; however, it may also be embodied as a flyweight carrier of a centrifugal rpm governor. A signal transducer 15 having a transducer housing 16 fabricated of insulating material is inserted in a reception bore 14 of the housing 11 and connected to a test circuit 18 provided with a battery 17.

The signal transducer 15, in its transducer housing 16, receives a transducer body 19 which is displaceable radially with respect to the axis of rotation D; the transducer body 19 substantially comprises two body parts 19a and 19b, which are electrically separated by means of an insulating layer 21 passing through its central axis marked M, but are connected to one another by means of an adhesive. Both body parts 19a and 19b are connected via electrical terminals 22 and 23 to the test circuit 18 and simultaneously serve as switching contacts of a first contact switch 24 and a second contact switch 25. To this end, one body part 19a is provided with a prong-like contact part 26, which in its illustrated position is in contact with a contact tab 27 of the first contact switch 24. This contact switch 24 can function purely as a contact switch, as indicated by the solid lines of the drawing, but it is also possible for it to be embodied as an end switch, as is indicated by a dashed connection 28 with the ground terminal of the battery 17.

The first contact switch 24 is part of a rough indication circuit 31, provided with a control light 29. A cross in the light 29 indicates that the switch 24 closes the rough indication circuit 31, and emits a corresponding preliminary signal by means of the switched-on control light 29. In the illustrated position of the transducer body 19, this body has been lifted counter to the force of the restoring spring 32 in order to actuate the contact switch 24; this lifting is effected by means of the driveshaft 10 which has been rotated in the direction of an arrow P and by means of the angle indication marking 12 firmly connected with the driveshaft. In order to generate this lifting movement, the transducer body 19 is embodied on its outer end face, that is, the end face oriented toward the angle indication marking 12, as a shaped cam 33. If the driveshaft 10 or the part 13 provided with the angle indication 12 should rotate further in the direction of the arrow, into the middle position indicated in FIG. 2, then the angle indication marking 12 connects the two body parts 19a and 19b, which now serve as switch contacts of the second contact switch 25, so that a control light 35 which is part of a precise indication circuit 34 will then light up.

With the angle indication marking 12 located in an extension of the central axis M of the transducer body 19, the two switch contacts 19a and 19b together with the angle indication marking 12 form a contact bridge, thus embodying the second contact switch 25, and trigger a rotary position signal which precisely indicates the desired or previously adjusted, predetermined rotary position of the driveshaft 10. As soon as the angle indication marking 12 moves out of the middle position, the second control light 35 goes off again and indicates that the angle indication marking 12 is no longer in the middle position.

In the following exemplary embodiments, elements which are the same as or function the same as those of the first embodiment are indicated by the same reference numerals, while those which differ greatly are provided with a prime and new elements are given new reference numerals.

The second exemplary embodiment, shown in simplified form in FIG. 2, again includes the test circuit 18, provided with the two control lights 29 and 35; however, the two indicator circuits marked 31' and 34' are actuated in a different manner. The angle indication marking 12 is secured to the flyweight carrier 13 and is connected via a ground terminal 41 with the negative pole of the battery 17 and, depending upon its position at a particular time, serves as a switch contact or as a ground contact for the two contact switches of the signal transducer 15', which here are indicated by reference numerals 24' and 25'. The transducer body 19' carries two contact faces 19a' and 19b' which are insulated with respect to one another and to the transducer body 19' and which are located on the outer end face 33 of the transducer body 19', oriented toward the angle indication marking 12. Depending upon the rotary direction of the part 13, these contact faces 19a' and 19b' represent one or the other switch contact of the first and second contact switch 24' and 25'.

If the part 13 carrying the angle indication marking 12 rotates in the rotary direction indicated by the arrow P, then the angle indication marking serving as a switch contact meets the contact face 19a' and with it forms the first contact switch 24' inserted into the rough indication circuit 31'. If the angle indication marking 12 reaches the indicated middle position, then it also furnishes a contact with the second contact face 19b' and with it forms the second contact switch 25' inserted into the precise indication circuit 34'. In the illustrated middle position, both control lights 29 and 35 are on, as a result of which the precise middle position is indicated. If there is rotation of the part 13 counter to the direction of the arrow, the indicator circuit 34' would act as the rough indicator circuit, and the indicator circuit 31' would act as the precise indicator circuit, while the switch 25' would act as the first contact switch in the switch 24' as the second contact switch. Thus, depending on which control light lights up first, the circuit shown in FIG. 2 also indicates the particular direction of rotation with which the angle indication marking 12 approaches the middle position which is to be measured.

Figure 3:
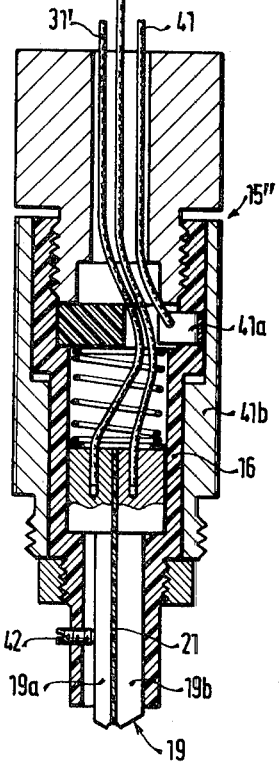
FIG. 3 illustrates a practical exemplary embodiment of a signal transducer which is usable with the second exemplary embodiment.
Figure 2:
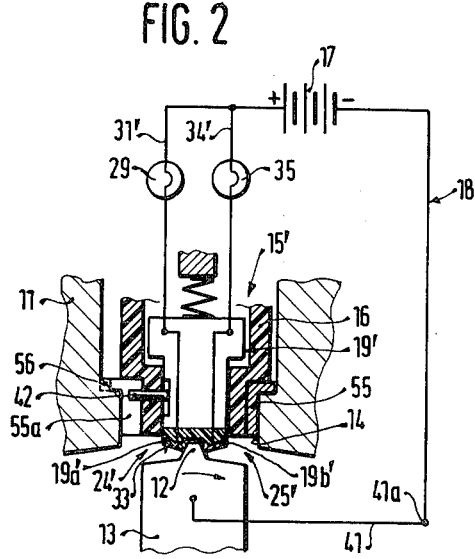
FIG. 2 is a simplified illustration of the second exemplary embodiment.

The practical exemplary embodiment shown in section and FIG. 3 for the signal transducer 15'', usable in FIG. 2, includes in its transducer housing 16, made of insulating material, a transducer body which, as in the first exemplary embodiment, is fabricated of two body parts 19a and 19b by means of an interposed insulating layer 21 and therefore is also identified, as in FIG. 1, with reference number 19. The connections to the test circuit 18 are effected as in FIG. 2. As part of the ground connection 41, the signal transducer 15" includes a sliding contact 41a, which via a metal knurled screw 41b establishes the ground connection from the battery 17 to the angle indication marking 12 (see FIG. 2 as well). A set screw prong 42 secured in the transducer housing 16 serves both to secure the rotary position of the transducer body 19 with respect to the housing 16 and also to secure the rotary position of the transducer housing 16 with respect to the reception bore, not shown here in further detail, in the associated housing. The lines carried from the interior of the signal transducer 15" outward and connected with the switch contact 19a and 19b are indicated for the sake of simplicity as 31' and 34' because they may be considered as parts of these two indicator circuits.

Figure 4:
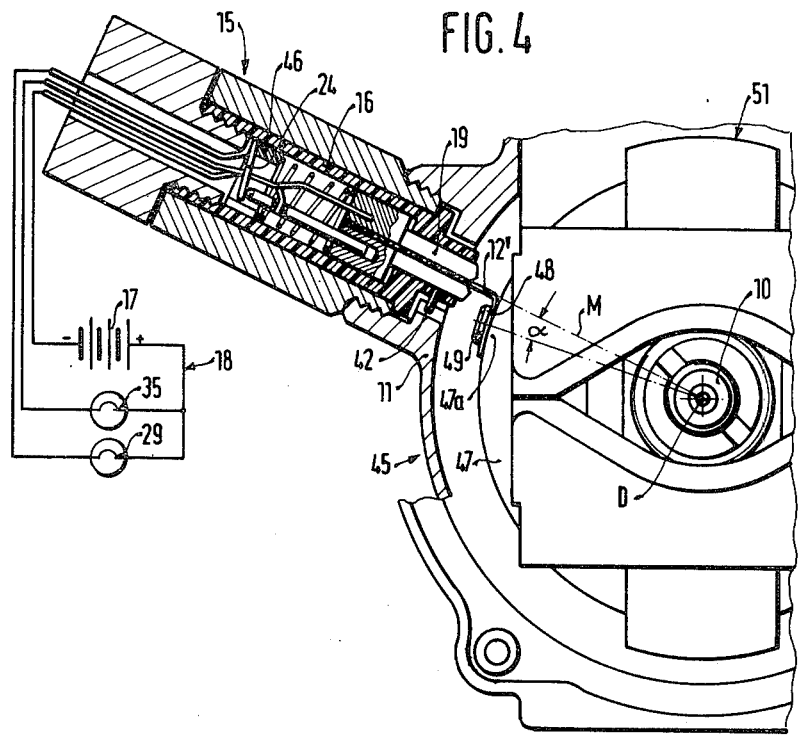
FIG. 4 illustrates a third exemplary embodiment, with a practical exemplary embodiment of a signal transducer usable with the first exemplary embodiment as shown in cross section.

In the third exemplary embodiment shown in FIG. 4, the signal transducer 15 provided with the test circuit 18 is inserted into the housing 11 of a centrifugal rpm governor 45, its rotary position secured by the set screw 42. The signal transducer 15, shown in longitudinal section, corresponds to signal transducer 15 of FIG. 1 both in structure and function, and inside the transducer housing 16 it carries the first contact switch 24 secured to an insulating plate 46 on the housing 16. In this exemplary embodiment, shown in FIGS. 4 through 6, the angle indication marking 12' comprises a tab protruding beyond the surface of a sheet-metal capsule 47 and bent at right angles, the tab being part of a sheet-metal bracket 48 which is riveted by means of a blind rivet 49 to a wall part 47a of this sheet-metal capsule 47. The sheet-metal capsule 47 is part of a flyweight unit 51 of the rpm governor 45 mounted on an injection pump, not shown in further detail. The sheet-metal capsule 47 is secured in a rotationally fixed manner on this unit 51 and connected thereby in a rotationally fixed manner with the driveshaft 10 serving as the rotational body. In order for the angle indication marking 12' on the sheet-metal bracket 48 to be capable of being secured in a precise rotary position on the sheet-metal capsule 47, corresponding to the supply onset for instance, the sheet-metal capsule 47 is provided with an oblong slot 52 extending to the circumferential direction of the sheet-metal capsule 47. For improved positional securing of the blind rivet 49 and thus the sheet-metal bracket 48, the oblong slot 52 is provided on its side walls 52a with a fine-toothed surface (see FIG. 6).

Figure 5:
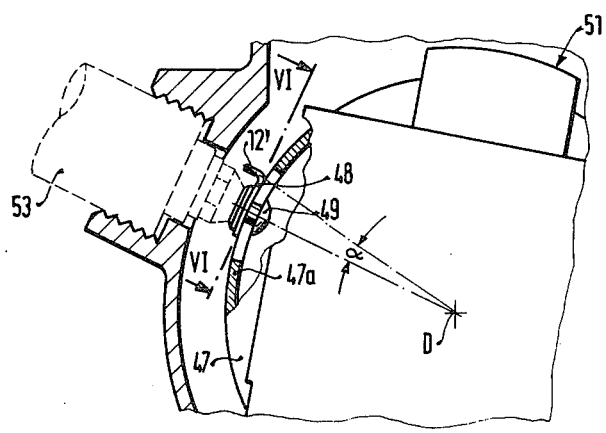
FIG. 5 illustrates a partial sectional view of the third exemplary embodiment with a tool drawn in for securing the angle indication marking.
Figure 6:
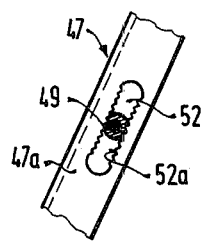
FIG. 6 is a section shown in part and taken along the line VI—VI of FIG. 5.

A riveting tool 53, shown in FIG. 5 in broken lines, serves to secure the sheet-metal bracket 48. A blind rivet 49 is secured by this riveting tool 53 with the drive shaft 10 having previously been rotated out of the middle axis M in the clockwise direction by the angle α in FIG. 4. The angle α corresponds precisely to the distance between the middle of the angle indication marking 12' and an associated bore, not shown, but receiving the blind rivet 49, in the sheet-metal bracket 48. As already described in connection with FIG. 1, here again both control lights 29 and 35 light up at the same time in the test circuit 18 when the angle indication marking is located precisely in the middle position of the transducer body 19.

In order to determine the predetermined rotary position of the angle indication marking 12 or 12', associated by way of example with the supply onset of a first pump element, the signal transducers 15 or 15' or 15" inserted into the housing 11, along with the associated test circuit 18, are used in all exemplary embodiments. Upon the initial adjustment of the position of the angle indication marking 12, 12' relative to the drive shaft 10, and in order to compensate for the existing angular deviation, either the angle indication marking 12, 12' itself can be adjusted relative to the drive shaft 10, as has been described in connection with FIGS. 4–6, or the built-in position of the housing can be changed, as indicated in FIG. 2, by inserting the housing 16 into the corresponding larger reception bore 14 of the housing 11 via an eccentric reception sleeve 55. This reception sleeve 55 is slotted on one side for receiving the set screw 42, and the slot 55a also serves the purpose of positionally fixing the reception sleeve 55 in the housing 11, which is provided with a protruding nose 56 for this purpose.

The simplest opportunity of making the position of the signal transducer 15 agree with the predetermined angular position of the drive shaft 10 while the angle indication marking 12 is in the middle position, for instance in the example shown in FIG. 1, is that the part 13 carrying the angle indication marking 12 is rotated relative to the drive shaft 10. This can be effected in the simplest manner by loosening a cone connection 57 between the two parts 10, 13 and subsequently tightening this connection once the parts are oriented properly. To this end, the part 13 and the drive shaft 10 are realized without the otherwise conventional wedge connection.

Although the essential functions have already been described in connection with the exemplary embodiments, one test operation will be described briefly below for locating the already-adjusted predetermined rotary position of the drive shaft 10, referring to FIGS. 1 and 2.

With an injection pump previously adjusted with respect to the predetermined rotary position of the angle indication marking 12, the signal transducer 15 connected with the test circuit 18 is inserted into the reception bore 14 of the housing 11, and the drive shaft 10 is rotated clockwise, in the direction of the arrow P, until such time as first, upon approaching the middle position, the control light 29 of the rough indication circuit 31 lights up. The cam shaft 10 is now rotated slowly further, until the second control light 35 of the precise indication circuit 34 lights up as well, as is the case with the exemplary embodiment shown in FIG. 2. If the drive shaft 10 were rotated still further only slightly beyond the predetermined rotary position, then the control light 35 would immediately go out, because the contact between the switch contacts 19a and 19b or 19a' and 19b' would have been interrupted. Regardless of whether the ground connection of the battery 17 is effected via a switch contact of a transducer body 19, as in the first exemplary embodiment of FIG. 1 and the third exemplary embodiment of FIG. 4, or is established via the angle indication marking 12, as in FIG. 2, still in all cases the lighting up of the two control lights 29 and 35 between indicates the precise, predetermined rotary position.

The battery 17 serving as a source of current supply can be embodied either by the battery supplying the motor with current or by a special battery, which is accommodated in a common housing together with the signal transducer 15, 15' and the test circuit 18 and can thus be handled like a test lamp. Depending upon the number of units manufactured and the available voltage source, luminous diodes or other warning and indication devices can also be used instead of the two described control lights 29 and 35.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An apparatus for ascertaining a predetermined rotary position of a rotational body mounted to a housing, such as the supply onset position of the drive shaft of a fuel injection pump for an internal combustion engine, comprising:

angle indication marking means fixedly connected to the rotational body for rotation therewith; and signal transducer means, including: a transducer housing fixedly secured to the rotational body housing; a rough indication circuit having a first contact switch; a precise indication circuit having a second contact switch and a rotary position signal means; and a transducer body displaceably guided in the transducer housing in a direction approximately radial with respect to the axis of rotation of the rotational body, wherein:

(i) the transducer body partly defines the second contact switch;

(ii) at a predetermined rotary position of the rotational body, the angle indication marking means trigger the first contact switch to energize the rough indication circuit; and (iii) at a subsequent predetermined rotary position of the rotational body, the angle indication marking means and the transducer body complete the second contact switch to energize the rotary position signal means of the precise indication circuit.

2. The apparatus as defined in claim 1, wherein the signal transducer means defines a central axis and further includes: two insulation layers, and wherein:

(iv) the transducer body comprises two body parts;

(v) one insulation layer insulates the transducer housing from the transducer body;

(vi) the other insulation layer separates the two body parts and has the central axis passing therethrough; and (vii) the two body parts serve as part of the second contact switch.

3. The apparatus as defined in claim 2, wherein:

(viii) the transducer body has an outer end face which defines two switch contacts located in the precise indication circuit; and (ix) when the angle indication marking means reaches the subsequent predetermined rotary position of the rotational body at which position it forms an extension of the central axis of the signal transducer means, the switch contacts and the angle indication marking means form the second contact switch.

4. The apparatus as defined in claim 1, wherein the signal transducer means further includes: a contact part connected with the transducer body, and wherein:

(iv) the first contact switch comprises a mechanically triggered end switch actuated by the contact part.

5. The apparatus as defined in claim 1, wherein:

(iv) the transducer body as an outer end face which defines two switch contacts serving as part of the first and second contact switches, said switch contacts being insulated relative to one another and relative to the transducer body.

6. The apparatus as defined in claim 5, wherein:

(v) The angle indication marking means forms the negative side of the first and second contact switches; and (vi) The two switch contacts defined by the outer end face of the transducer body, define the positive side of the first and second contact switches.

7. The apparatus as defined in claim 6, wherein:

(vii) one of the switch contacts and the angle indication marking means form the first contact switch of the rough indication switching circuit;

(viii) the other of the switch contacts and the angle indication marking means form the second contact switch of the precise indication switching circuit; and (ix) both contact switches are actuated for the purpose of indicating the predetermined rotary position of the rotational body.

8. The apparatus as defined in claim 1, wherein:

(iv) both indication circuits contain one indication device, said rotary position signal means forming the indication device for the precise indication circuit; and (v) both indication devices comprise, preferably, control lights.

9. The apparatus as defined in claim 1, wherein the angle indication marking means includes: a part fixedly connected to the rotational body; a sheet-metal bracket tab protruding beyond the surface of said part and bent at right angles thereto, said sheet-metal bracket being connected to said part by a rivet, and said part having a wall provided with an oblong slot extending circumferentially which receives said rivet.

10. The apparatus as defined in claim 9, wherein the rivet comprises a blind rivet.

11. The apparatus as defined in claim 9, wherein the side walls of the oblong slot have a fine-toothed surface.

12. The apparatus as defined in claims 9, 10 or 11, wherein said part comprises a sheet-metal capsule, the wall thereof by an at least partially cylindrical wall of the sheet-metal capsule, and wherein the sheet-metal capsule is preferably secured to a flyweight unit of an rpm governor mounted onto an injection pump.

* * * * *